United States Patent
Yamaguchi

(10) Patent No.: US 12,170,769 B2
(45) Date of Patent: Dec. 17, 2024

(54) VIDEO ENCODING METHOD, ENCODING PROCESSING METHOD, AND VIDEO ENCODING APPARATUS

(71) Applicant: Socionext Inc., Kanagawa (JP)

(72) Inventor: Satoshi Yamaguchi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 192 days.

(21) Appl. No.: 17/729,818

(22) Filed: Apr. 26, 2022

(65) Prior Publication Data

US 2022/0256155 A1 Aug. 11, 2022

Related U.S. Application Data

(63) Continuation of application No. PCT/JP2019/042759, filed on Oct. 31, 2019.

(51) Int. Cl.
| | |
|---|---|
| *H04N 19/124* | (2014.01) |
| *G06F 9/50* | (2006.01) |
| *H04N 19/172* | (2014.01) |
| *H04N 19/42* | (2014.01) |
| *H04N 19/91* | (2014.01) |

(52) U.S. Cl.
CPC ......... *H04N 19/124* (2014.11); *G06F 9/5027* (2013.01); *H04N 19/172* (2014.11); *H04N 19/42* (2014.11); *H04N 19/91* (2014.11)

(58) Field of Classification Search
CPC .... H04N 19/124; H04N 19/172; H04N 19/42; H04N 19/91; G05F 9/5027
USPC .................................................... 375/240.02
See application file for complete search history.

(56) References Cited

U.S. PATENT DOCUMENTS

| | | | | |
|---|---|---|---|---|
| 8,175,147 B1* | 5/2012 | Webb | .................. | H04N 19/159 |
| | | | | 375/240.06 |
| 2003/0095594 A1* | 5/2003 | Laksono | .............. | H04N 19/172 |
| | | | | 375/E7.181 |

(Continued)

FOREIGN PATENT DOCUMENTS

| | | |
|---|---|---|
| JP | 2005-159441 A | 6/2005 |
| JP | 2005-323166 A | 11/2005 |
| JP | 2007-166192 A | 6/2007 |

OTHER PUBLICATIONS

International Search Report and Written Opinion issued in corresponding International Application No. PCT/JP2019/042759 dated Jan. 21, 2020 w/English Translation.

(Continued)

*Primary Examiner* — Dominic D Saltarelli
(74) *Attorney, Agent, or Firm* — Rimon P.C.

(57) ABSTRACT

A video encoding method includes: storing quantized data of frames which have undergone a quantization process by serially storing the quantized data of the frames on a per quantized data of one frame basis; determining a quantization parameter to be used when performing a quantization process of a next frame immediately following the frames, based on quantized data of a predetermined number of frames among the quantized data of the frames; performing the quantization process of the next frame based on the quantization parameter to generate quantized data of the next frame;
and executing encoding processes for entropy encoding quantized data of frames including the next frame in parallel between the frames including the next frame.

12 Claims, 9 Drawing Sheets

(56) References Cited

U.S. PATENT DOCUMENTS

| | | | |
|---|---|---|---|
| 2003/0185297 A1* | 10/2003 | Greenfield | H04N 19/423 |
| | | | 375/E7.184 |
| 2005/0123037 A1 | 6/2005 | Kondo et al. | |
| 2005/0249280 A1 | 11/2005 | Kondo et al. | |
| 2007/0133678 A1 | 6/2007 | Sakai | |
| 2016/0173875 A1 | 6/2016 | Zhang et al. | |
| 2019/0253716 A1* | 8/2019 | Miyauchi | H04N 19/174 |

OTHER PUBLICATIONS

Yusuke Yatabe, et al. "A Parallelization Technology of H.264 CABAC for Real Time Encoder of Moving Picture," Journals of Information Processing, issued by Information Processing Society of Japan in Consumer Device & System, vol. 5. No. 5, 1-8, Dec. 2015 w/English Abstract; cited in the ISR.

Japanese Office Action dated Oct. 3, 2023 issued in the corresponding Japanese Patent Application No. 2021-553979, with English machine translation.

Chinese Office Action dated Dec. 6, 2023 issued in the corresponding Chinese Patent Application No. 201980100551.6, with English machine translation.

Japanese Office Action dated Feb. 6, 2024 issued in the corresponding Japanese Patent Application No. 2021-553979, with English machine translation.

Chinese Office Action dated Mar. 9, 2024 issued in the corresponding Chinese Patent Application No. 201980100551.6, with English machine translation.

\* cited by examiner

FIG. 2
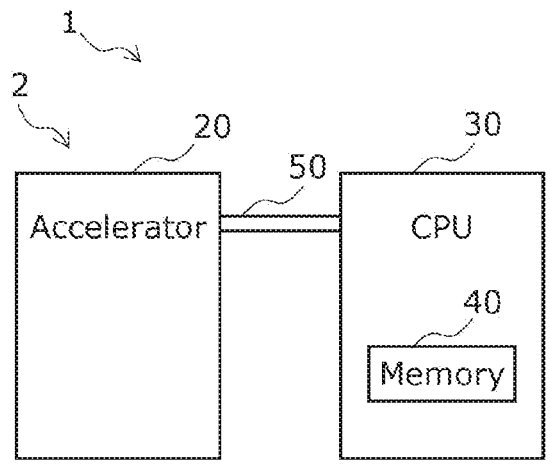
FIG. 3
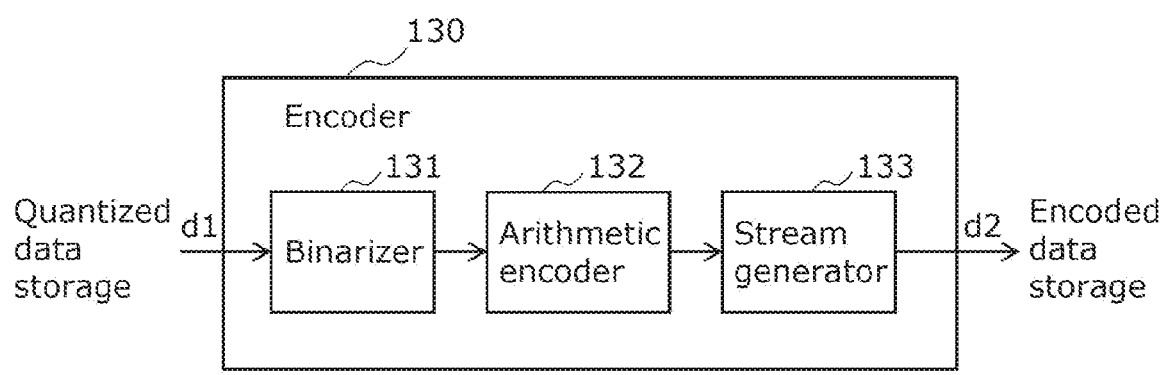
FIG. 4

VIDEO ENCODING METHOD, ENCODING PROCESSING METHOD, AND VIDEO ENCODING APPARATUS

CROSS REFERENCE TO RELATED APPLICATION

This is a continuation application of PCT International Application No. PCT/JP2019/042759 filed on Oct. 31, 2019, designating the United States of America. The entire disclosure of the above-identified application, including the specification, drawings and claims are incorporated herein by reference in its entirety.

FIELD

The present disclosure relates to a video encoding method, an encoding processing method, and a video encoding apparatus.

BACKGROUND

Services for distributing videos via networks have been known. In order to extend such services, it has been desired to accelerate quantization processes and encoding processes of frames included in videos and increase accuracy in rate control for controlling bitrates when performing the encoding processes.

Patent Literature (PTL) 1 discloses a technique for performing a quantization process and an encoding process of a frame next to a frame which has undergone an encoding process, based on the amount of data of the encoded frame. Non Patent Literature (NPL) 1 also discloses a technique for executing encoding processes of a plurality of frames in parallel, thereby accelerating the encoding processes.

CITATION LIST

Patent Literature

PTL 1: Japanese Unexamined Patent Application Publication No. 2007-166192

Non Patent Literature

NPL 1: "A Parallelization Technology of H.264 CABAC for Real Time Encoder of Moving Picture" written by Yusuke Yatabe, and 5 others, and presented in Consumer Device & System, Vol. 5, No. 5, 1-8 (December 2015) included in the Journals of Information Processing, issued by Information Processing Society of Japan

SUMMARY

Technical Problem

In the technique disclosed in PTL 1, a quantization process and an encoding process of a frame is performed based on an amount of data of another frame which has undergone an encoding process. The encoding process, etc., of the frame is performed based on partial data included in the entire data of the frame. Thus, the technique in PTL 1 has a problem that accuracy in rate control becomes low. NPL 1 discloses that encoding processes are executed in parallel, but does not disclose how to increase accuracy in rate control.

The present disclosure has been made in consideration of the above-described circumstances. Thus, the present disclosure has an object to provide a video encoding method, etc., which make it possible to accelerate quantization processes and encoding processes and increase accuracy in rate control.

Solution to Problem

A video encoding method according to an aspect of the present disclosure includes: storing quantized data of a plurality of frames which have undergone a quantization process by serially storing the quantized data of the plurality of frames on a per quantized data of one frame basis; determining a quantization parameter to be used when a quantization process of a next frame immediately following the plurality of frames is performed, based on quantized data of at least one frame among the quantized data of the plurality of frames; performing the quantization process of the next frame based on the quantization parameter to generate quantized data of the next frame; and executing encoding processes for entropy encoding quantized data of a plurality of frames including the next frame in parallel between the plurality of frames including the next frame.

An encoding processing method according to an aspect of the present disclosure includes: storing quantized data of a plurality of frames which have undergone a quantization process by serially storing the quantized data of the plurality of frames on a per quantized data of one frame basis; determining a quantization parameter to be used when performing a quantization process of a next frame immediately following the plurality of frames, based on quantized data of at least one frame among the quantized data of the plurality of frames; performing the quantization process of the next frame based on the quantization parameter to generate quantized data of the next frame; and outputting quantized data of a plurality of frames including the next frame to an external central processing unit (CPU).

A video encoding apparatus according to an aspect of the present disclosure includes: a quantized data storage which stores quantized data of a plurality of frames which have undergone a quantization process by serially storing the quantized data of the plurality of frames on a per quantized data of one frame basis; a rate controller which determines an amount of bit data of a next frame immediately following the plurality of frames, based on quantized data of at least one frame among the quantized data of the plurality of frames; a parameter determiner which determines a quantization parameter to be used when a quantization process of the next frame is performed, based on the amount of bit data determined by the rate controller; a quantizer which performs the quantization process of the next frame based on the quantization parameter to generate quantized data of the next frame; and an encoder which executes encoding processes for entropy encoding quantized data of a plurality of frames including the next frame in parallel between the plurality of frames including the next frame.

An encoding processing apparatus according to an aspect of the present disclosure includes: a quantized data storage which stores quantized data of a plurality of frames which have undergone a quantization process by serially storing the quantized data of the plurality of frames on a per quantized data of one frame basis; a parameter determiner which receives, from outside, an amount of bit data determined using quantized data of at least one frame among the quantized data of the plurality of frames, and determines a quantization parameter to be used when a quantization process of a next frame immediately following the plurality of frames is performed; a quantizer which performs the quantization process of the next frame based on the quantization parameter to generate quantized data of the next frame.

It is to be noted that these general or specific aspects may be implemented using a system, a method, an apparatus, an integrated circuit, a computer program, or a computer readable recording medium such as a CD-ROM, or any combination of systems, methods, apparatuses, integrated circuits, computer programs, and media.

Advantageous Effects

The video encoding method, etc., of the present disclosure make it possible to accelerate quantization processes and encoding processes and increase accuracy in rate control.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a diagram illustrating circuit components of the video encoding apparatus according to Embodiment 1.

FIG. 3 is a diagram illustrating a structure of an encoder of the video encoding apparatus according to Embodiment 1.

FIG. 4 is a schematic diagram of encoded data which is generated by the encoder of the video encoding apparatus according to Embodiment 1.

DESCRIPTION OF EMBODIMENTS

Hereinafter, embodiments will be described with reference to the drawings. Note that the embodiments described below each indicate a specific example of the present disclosure. The numerical values, shapes, materials, elements, the arrangement and connection of the elements, steps, the order of the steps, etc., indicated in the following embodiments are mere examples, and are not intended to limit the present disclosure. Therefore, among the elements in the following embodiments, elements not recited in any one of the independent claims that define aspects of the present disclosure are described as optional elements. Each of the embodiments of the present disclosure is not limited to any one of the current independent claims, and can be represented by any other independent claim.

It is to be noted that each of the diagrams is a schematic diagram, and thus is not always indicated precisely. In addition, in the respective drawings, substantially the same elements are assigned with the same reference signs, and overlapping descriptions may be omitted or simplified.

Embodiment 1

[1-1. The Structure of a Video Encoding Apparatus]

The structure of a video encoding apparatus according to Embodiment 1 is described with reference to FIGS. 1 to 4.

Figure 1:
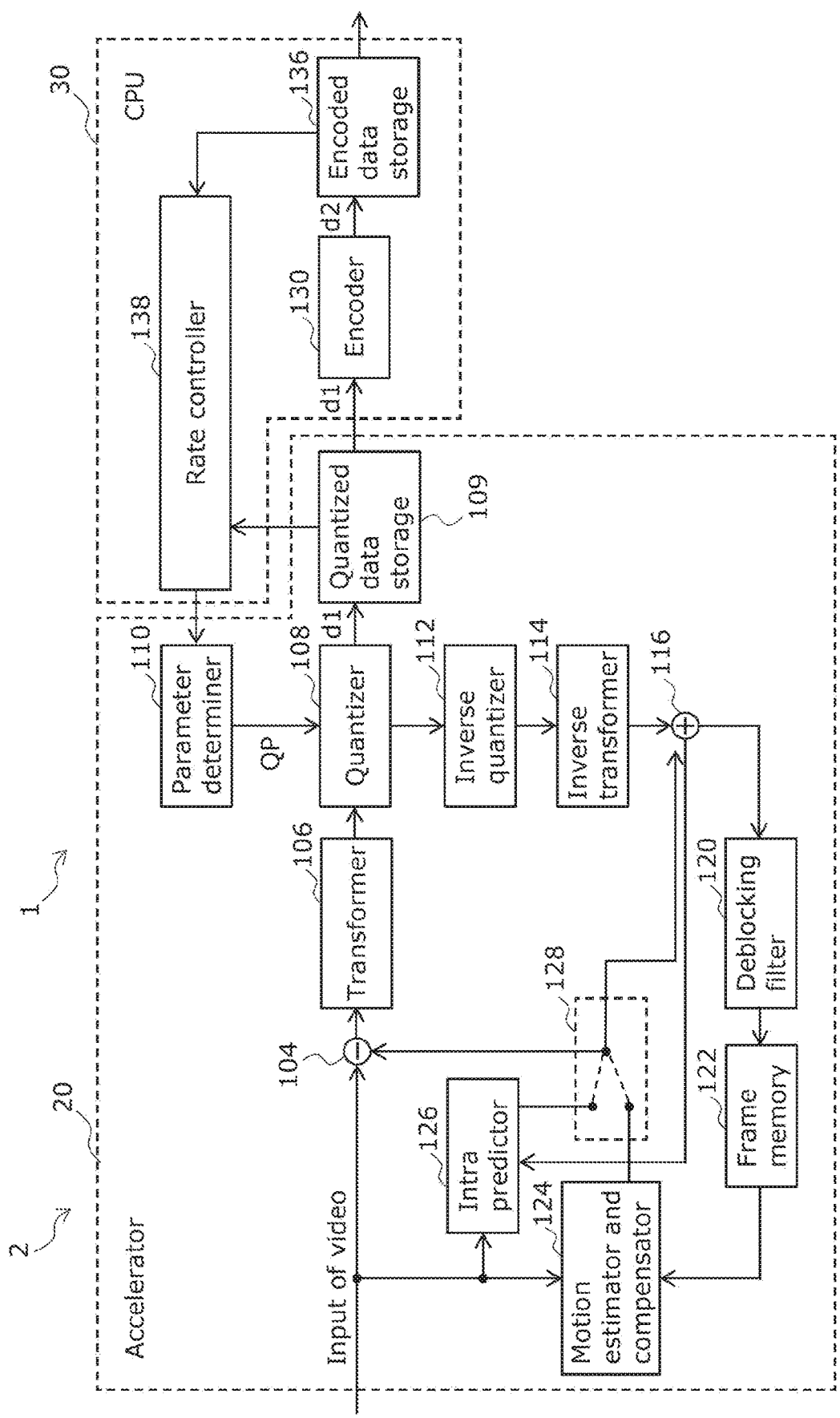
FIG. 1 is a block structural diagram of a video encoding apparatus according to Embodiment 1.

FIG. 1 is a block structural diagram of video encoding apparatus 1 according to Embodiment 1. Video encoding apparatus 1 is an apparatus which quantizes and encodes a plurality of frames included in a video on a per frame basis.

As illustrated in FIG. 1, video encoding apparatus 1 includes subtractor 104, transformer 106, quantizer 108, quantized data storage 109, parameter determiner 110, encoder 130, encoded data storage 136, and rate controller 138. Video encoding apparatus 1 further includes inverse quantizer 112, inverse transformer 114, adder 116, deblocking filter 120, frame memory 122, motion estimator and compensator 124, intra predictor 126, and prediction controller 128.

FIG. 2 is a diagram illustrating exemplary circuit components included in video encoding apparatus 1.

As illustrated in FIG. 2, video encoding apparatus 1 includes central processing unit (CPU) 30 and accelerator 20.

CPU 30 and accelerator 20 are connected by communication interface 50 conforming to a peripheral component interconnector (PCI).

Accelerator 20 is a circuit component which supports acceleration of computation processes which are performed by CPU 30, and is a field programmable gate array (FPGA). Accelerator 20 corresponds to encoding processing apparatus 2.

CPU 30 is a circuit component which manages overall operations which are performed by video encoding apparatus 1. CPU 30 includes memory 40, and memory 40 stores software programs. CPU 30 is capable of executing a plurality of threads corresponding to a plurality of programs in parallel. To execute the plurality of threads in parallel means to execute processes in the plurality of threads independently in a time-overlapping manner. For example, when 8 threads can be executed by CPU 30, CPU 30 is capable of executing the 8 threads in one-to-one association with 8 frames included in a video independently in the same time periods or in different time periods.

When the software program is executed, CPU 30 executes each of the functions of encoder 130, encoded data storage 136, and rate controller 138. Furthermore, accelerator 20 executes each of the functions of subtractor 104, transformer 106, quantizer 108, quantized data storage 109, parameter determiner 110, inverse quantizer 112, inverse transformer 114, adder 116, deblocking filter 120, motion estimator and compensator 124, intra predictor 126, and prediction controller 128. It is to be noted that the function of encoded data storage 136 may be executed by a circuit component different from CPU 30.

First, the functions executed by accelerator 20 and the functions executed by CPU 30 are described with reference to FIG. 1.

Subtractor 104 subtracts a prediction signal from an original signal input to video encoding apparatus 1 to calculate a prediction error of each of frames included in a video. The prediction error calculated by subtractor 104 is output to transformer 106. The prediction error and the prediction signal are described later.

Transformer 106 transforms the prediction error in a spatial domain into data in a frequency domain. Specifically, for example, transformer 106 performs discrete cosine transform (DCT) of the prediction error in the spatial domain. The data transformed by transformer 106 is output to quantizer 108.

Quantizer 108 performs a quantization process of the data output from transformer 106 to generate quantized data d1. Specifically, quantizer 108 quantizes the data in the frequency domain based on quantization parameter QP to be described later. Quantization parameter QP is a parameter which defines a quantization step. For example, changing quantization parameter QP to increase a quantization step provides a rough quantization, resulting in a small amount of data. Quantization processes of respective frames are executed serially by quantizer 108 on a per frame basis. It is to be noted that computation processes of data in respective frames may be executed serially or in parallel. Quantized data d1 generated by quantizer 108 is output to quantized data storage 109 and inverse quantizer 112.

Quantized data storage 109 stores quantized data d1 of the frames which have undergone the quantization processes by quantizer 108. Specifically, quantized data storage 109 serially stores quantized data d1 of the frames generated by quantizer 108 on a per frame basis, on a per quantized data d1 of one frame basis. In this way, quantized data d1 of the plurality of frames are stored in quantized data storage 109. Quantized data d1 stored in quantized data storage 109 are output to encoder 130 and rate controller 138.

Quantized data d1 of each of the frames stored in quantized data storage 109 is output to encoder 130 and rate controller 138 when the quantization process is finished. In other words, quantized data d1 of one frame which has undergone the quantization process by accelerator 20 is output to CPU 30 via communication interface 50 when the quantization process is finished.

It is to be noted that the data output from quantized data storage 109 to encoder 130 is not limited to quantized data d1, and may be computed data which has been obtained through a computation process based on quantized data d1. For example, the computed data may be binary data binarized based on quantized data d1, or data obtained by being binarized based on quantized data d1 and then being arithmetic encoded.

Encoder 130 entropy encodes quantized data d1 output from quantized data storage 109 to generate encoded data d2. Encoded data d2 is a bitstream which has been compression-generated by entropy encoding.

FIG. 3 is a diagram illustrating a structure of encoder 130 of video encoding apparatus 1.

As illustrated in FIG. 3, encoder 130 includes: binarizer 131 which binarizes quantized data d1 which has been input; arithmetic encoder 132 which encodes binary data binarized by binarizer 131; and stream generator 133 which generates a bitstream.

FIG. 4 is a schematic diagram illustrating encoded data d2 that is generated by encoder 130.

Encoded data d2 includes header information, supplemental information, filler data, and compressed image data. Header information is information regarding a frame, a frame group, or a slice which is a part of a frame. Supplemental information is information about a display method, etc., and various kinds of information which is necessary for an application. Filler data is padding data which is necessary for rate control. Compressed image data is image data generated by encoding quantized data d1.

Encoding processes by encoder 130 are performed on a per frame basis, and the encoding processes of a plurality of frames included in a video are executed in parallel. Encoded data d2 generated by encoder 130 is output to encoded data storage 136. It is to be noted that the encoding processes of the respective frames are independent of the other encoding processes, and thus any of the encoding processes can be started independently in the case where the pre-stage process has been finished.

It is only necessary that the encoding processes which are executed in parallel by encoder 130 be processes which are executed by at least one of binarizer 131, arithmetic encoder 132, or stream generator 133 illustrated in FIG. 3. For example, when data which is output from accelerator 20 to CPU 30 is binary data binarized based on quantized data d1, the encoding process which is executed by encoder 130 may be a process which is executed by arithmetic encoder 132 and stream generator 133. Alternatively, when data which is output from accelerator 20 to CPU 30 is arithmetic encoded data obtained by arithmetic encoding the binary data binarized based on quantized data d1, the encoding process which is executed by encoder 130 may be a process which is executed by stream generator 133.

Encoded data storage 136 is a first-in first-out (FIFO) storage for buffering encoded data d2 generated by encoder 130. Encoded data storage 136 re-arranges frames in the same order as the order of starting the encoding processes of the frames by encoder 130, and outputs the re-arranged frames to outside of video encoding apparatus 1. In addition, encoded data storage 136 outputs, to rate controller 138, information about the amount of encoded data d2 stored in encoded data storage 136.

Rate controller 138 determines the amount of bit data when next data is processed based on past data. Rate controller 138 obtains information about the amount of encoded data d2 output from encoded data storage 136, receives quantized data d1 output from quantized data storage 109, and obtains information about the amount of past quantized data d1. Rate controller 138 determines the amount of bit data when an encoding process of the next frame is performed based on the obtained information about the amounts of data d1 and d2. The amount of bit data determined by rate controller 138 in CPU 30 is output to parameter determiner 110 in accelerator 20 via communication interface 50.

Parameter determiner 110 determines quantization parameter QP when the next quantization process is performed based on the amount of bit data output from rate controller 138. Specifically, parameter determiner 110 determines quantization parameter QP so that the amount of encoded data d2 which is generated through the next quantization process and encoding process is a value close to the amount of bit data. Quantization parameters QP of frames are determined serially on a per frame basis.

When determining the amount of bit data, rate controller 138 determines the amount of bit data based on past data of a plurality of frames. In this embodiment, rate controller 138 does not always use the amount of bit data of encoded data d2 generated by encoder 130 when determining a target amount of bit data of the next frame immediately following a plurality of past frames. Stated differently, as for the amount of bit data of at least one frame among the plurality of past frames, rate controller 138 uses an estimated amount of bit data of encoded data d2 of the at least one frame. The estimated amount of bit data has been estimated using quantized data d1 of the at least one frame, for use as a replacement for the amount of bit data of encoded data d2 of the at least one frame. In this way, in this embodiment, rate controller 138 estimates the amount of bit data of each of one or more frames included in a predetermined number of frames among the plurality of past frames, using quantized data d1 of the frame, and regards, as it is, the amount of bit data of encoded data d2 of each of one or more other frames among the plurality of past frames as the amount of bit data of the other frame, thereby determining the target amount of bit data of the next frame using these amounts of bit data including the estimated amount of bit data. It is to be noted that the predetermined number of frames is, for example, the number of threads in encoding processes which are executed in parallel by encoder 130 in CPU 30 (see FIG. 6).

When estimating the amount of bit data, rate controller 138 estimates the amount of bit data using the amount of quantized data d1. Use of the amount of quantized data d1 means use of current data to be encoded among the quantized data. The amount of bit data is determined based on a value obtained by multiplying the amount of quantized data d1 by a predetermined coefficient in order to match the scale of the amount of quantized data d1 and the scale of the amount of encoded data d2. It is to be noted that the predetermined coefficient is set appropriately according to the kind of a video.

Quantization parameter QP determined in parameter determiner 110 is output to quantizer 108. Quantizer 108 executes a quantization process of a next frame based on quantization parameter QP received from parameter determiner 110.

Next, other functions which are executed by accelerator 20 are described briefly.

Inverse quantizer 112 inverse quantizes quantized data d1 output from quantizer 108.

Inverse transformer 114 restores a prediction error by inverse transforming data output from inverse quantizer 112.

Adder 116 reconstructs a frame by adding the prediction error output from inverse transformer 114 and a prediction signal output from prediction controller 128. The frame reconstructed by adder 116 is output to frame memory 122 via deblocking filter 120.

Frame memory 122 stores the reconstructed frame filtered by deblocking filter 120. The reconstructed frame is used as a reference picture for motion estimator and compensator 124 and intra predictor 126.

Motion estimator and compensator 124 performs inter prediction (also referred to as inter-frame prediction) of a frame by referring to a reference picture stored in frame memory 122. For example, motion estimator and compensator 124 performs motion estimation in a reference picture, and performs motion compensation using a motion vector obtained by the motion estimation, thereby generating an inter prediction signal for a frame. The inter prediction signal generated by motion estimator and compensator 124 is output to prediction controller 128.

Intra predictor 126 performs intra prediction (also referred to as intra-frame prediction) of a frame. For example, intra predictor 126 performs intra prediction by referring to data of a frame that is adjacent in a predetermined direction, thereby generating an intra prediction signal. The intra prediction signal generated by intra predictor 126 is output to prediction controller 128.

Prediction controller 128 selects one of the intra prediction signal and the inter prediction signal, and outputs the selected signal as a prediction signal to subtractor 104 and adder 116. It is to be noted that the motion vector generated by motion estimator and compensator 124 and the intra prediction direction predicted by intra predictor 126 may be output to encoder 130 in CPU 30 via communication interface 50.

Video encoding apparatus 1 according to this embodiment includes: quantized data storage 109 which stores quantized data d1 of a plurality of frames which have undergone a quantization process by serially storing quantized data d1 of the plurality of frames on a per quantized data d1 of one frame basis; rate controller 138 which determines an amount of bit data of a next frame immediately following the plurality of frames, based on quantized data d1 of at least one frame among quantized data d1 of the plurality of frames; parameter determiner 110 which determines quantization parameter QP to be used when a quantization process of the next frame is performed, based on the amount of bit data determined by the rate controller; quantizer 108 which performs the quantization process of the next frame based on quantization parameter QP to generate quantized data d1 of the next frame; and encoder 130 which executes encoding processes for entropy encoding quantized data d1 of a plurality of frames including the next frame in parallel between the plurality of frames including the next frame.

In this way, since rate controller 138 determines the amount of bit data using quantized data d1 of the at least one frame among quantized data d1 of the plurality of frames, rate controller 138 is capable of determining the amount of data using quantized data d1 even when, for example, an encoding process of the at least one frame by encoder 130 has not been finished, which allows parameter determiner 110 to determine quantization parameter QP based on the determined amount of bit data. In this way, it is possible to accelerate quantization processes and encoding processes. Furthermore, it is possible to increase accuracy in rate control in encoding processes more significantly by determining quantization parameter QP based on quantized data d1 of the one frame than in the case of determining quantization parameter QP based on, for example, partial data of a frame.

Encoding processing apparatus 2 according to this embodiment includes: quantized data storage 109 which stores quantized data d1 of a plurality of frames which have undergone a quantization process by serially storing quantized data d1 of the plurality of frames on a per quantized data d1 of one frame basis; parameter determiner 110 which receives, from outside, an amount of bit data determined using quantized data d1 of at least one frame among quantized data d1 of the plurality of frames, and determines quantization parameter QP to be used when a quantization process of a next frame immediately following the plurality of frames is performed; quantizer 108 which performs the quantization process of the next frame based on quantization parameter QP to generate quantized data d1 of the next frame.

In this way, since parameter determiner 110 determines quantization parameter QP based on the amount of bit data determined using quantized data d1 of the at least one frame among quantized data d1 of the plurality of frames, parameter determiner 110 is capable of determining quantization parameter QP based on quantized data d1 even when, for example, an encoding process of the at least one frame which is executed at a later stage in encoding processing apparatus 2 has not been finished, which allows parameter determiner 110 to determine quantization parameter QP based on the determined quantization parameter QP. In this way, it is possible to accelerate quantization processes. Furthermore, it is possible to increase accuracy in rate control in encoding processes more significantly by determining quantization parameter QP based on quantized data d1 of the one frame than in the case of determining quantization parameter QP based on, for example, partial data of a frame.

[1-2. A Video Encoding Method]

A video encoding method according to Embodiment 1 is described with reference to FIGS. 5 to 6.

Figure 5:
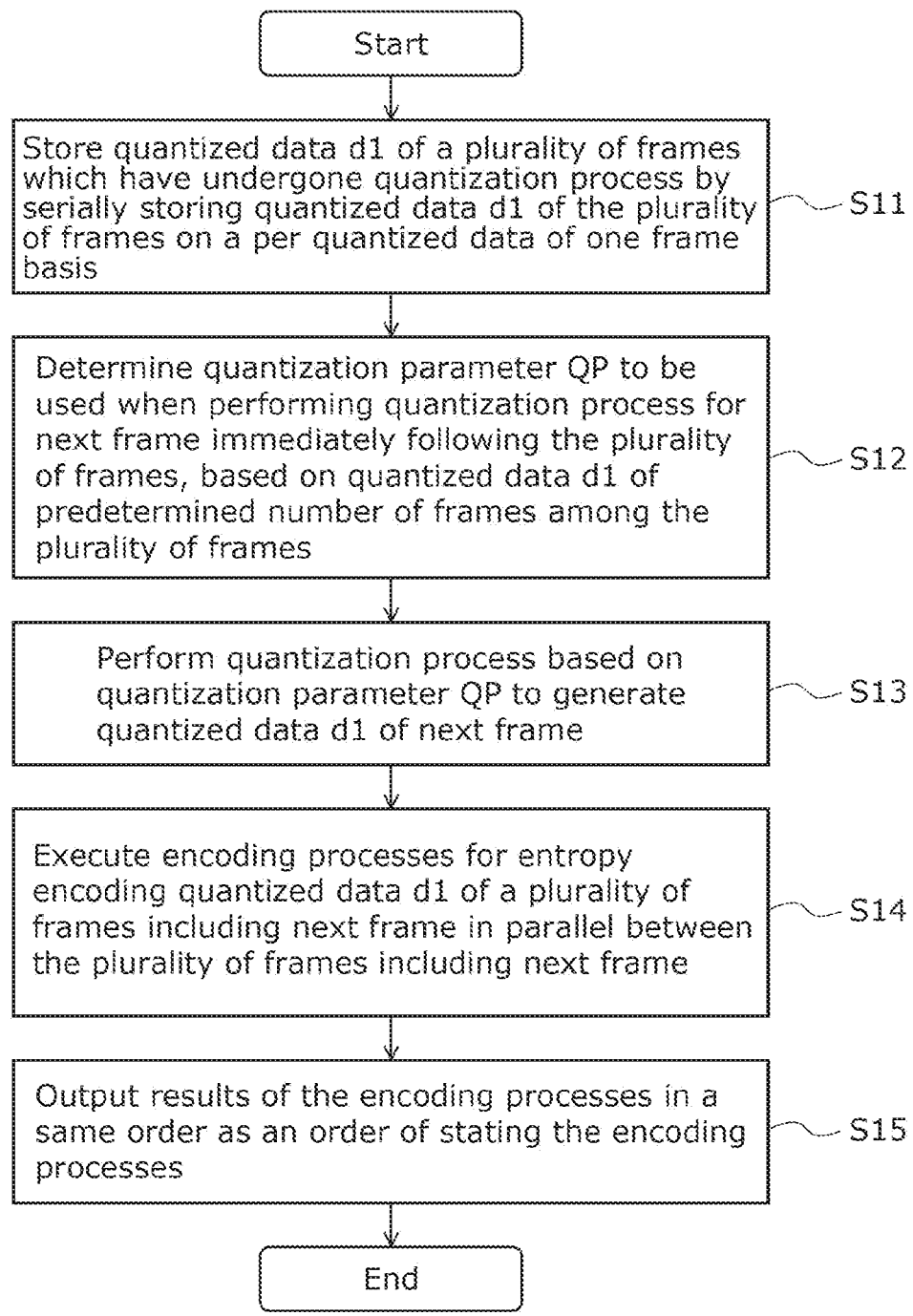
FIG. 5 is a flow chart indicating a video encoding method according to Embodiment 1.

FIG. 5 is a flow chart indicating a video encoding method according to Embodiment 1. The video encoding method includes processes in S11 to S15 indicated below.

(S11) Storing quantized data d1 of a plurality of frames which have undergone a quantization process by serially storing quantized data d1 of the plurality of frames on a per quantized data d1 of one frame basis (S12) Determining quantization parameter QP to be used when a quantization process of a next frame immediately following the plurality of frames is performed, based on quantized data d1 of a predetermined number of frames among quantized data d1 of the plurality of frames (S13) Performing the quantization process of the next frame based on quantization parameter QP to generate quantized data d1 of the next frame (S14) Executing encoding processes for entropy encoding quantized data d1 of a plurality of frames including the next frame in parallel between the plurality of frames including the next frame (S15) Outputting results of the encoding processes in a same order as an order of stating the encoding processes The video encoding method is executed by video encoding apparatus 1. Although the processes in S11 to S15 are described in time series focusing on a particular frame, in the video encoding method, the quantization processes and the encoding processes are actually performed by accelerator 20 and CPU 30 at the same time.

Figure 6:
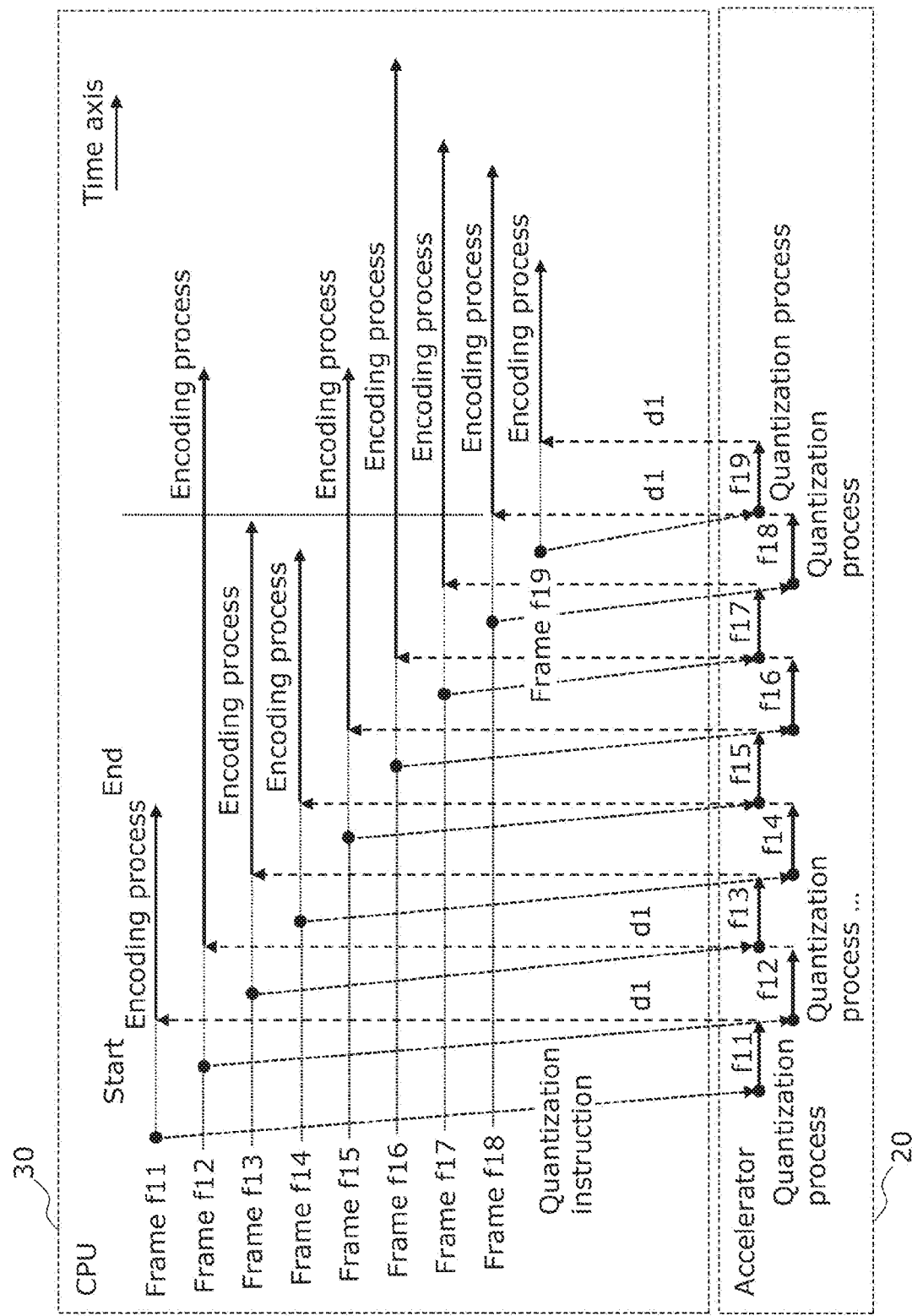
FIG. 6 is a timing chart of quantization processes and encoding processes of respective frames executed in the video encoding method according to Embodiment 1.

FIG. 6 is a timing chart indicating operations which are performed by video encoding apparatus 1 according to Embodiment 1. FIG. 6 describes an example in which the number of threads in encoding processes to be executed in parallel by encoder 130 is 8, in other words, the number of threads to be generated by CPU 30 is 8.

FIG. 6 illustrates a scene in which quantization processes of frames f11 to f18 have been finished, and a quantization process of next frame f19 is about to be started. Specifically, FIG. 6 illustrates an example in which encoding processes of 8 frames which are frames f11 to f18 by encoder 130 have been started at respectively different points of time and finished at different points of time individually. In this example, the quantization processes of the plurality of frames do not include any serial processes, and all the quantization processes are executed individually and independently of the other processes. This also applies to the encoding processes of the plurality of frames. The reason why all the starting and finishing time points of the processes of frames f11 to f18 are different as indicated above is because the amounts of data of respective frames f11 to f18 are different.

A current quantization process by accelerator 20 is started in response to a quantization instruction output from CPU 30. The quantization instruction is output from CPU 30 after start of the quantization process of frame f18 that is immediately before frame f19 which is a target for the current quantization process. As illustrated in FIG. 6, at the time when the quantization process of next frame f19 is started, the encoding processes of frames f11, f13, and f14 have been finished, but the encoding processes of other frames f12, and f15 to f18 have not been finished.

Thus, when the quantization parameter QP is determined, in this embodiment, quantization parameter QP is determined without using encoded data d2. In other words, quantization parameter QP is determined based on a predetermined number of quantized data d1 regardless of whether the encoding processes of frames f11 to f18 have been finished. It is to be noted that the predetermined number of frames is, for example, the number of threads in encoding processes which are executed in parallel by encoder 130. In the example illustrated in FIG. 6, quantization parameter QP is determined based on a total value of quantized data d1 of all of the plurality of frames f11 to f18.

Although the quantization instruction described above is output from CPU 30 after the quantization process of frame f18 which is immediately before frame f19 is started, it is to be noted that this is a non-limiting example. For example, when a plurality of threads are executed at the same time in CPU 30, and the encoding processes of the plurality of frames are assigned respectively to the plurality of threads, the quantization instruction may be output from CPU 30 after an encoding process of a first frame among the encoding processes of the plurality of frames is finished in a predetermined thread among the plurality of threads, that is, when a thread available for processing is present. In this case, the encoding process of a second frame different from the first frame among the plurality of frames is stared immediately after the encoding process of the first frame is finished, and thus, substantially, the quantization instruction is output from CPU 30 after the encoding process of the first frame is finished and the encoding process of the second frame different from the first frame is started.

Next, quantized data d1 of frame f19 is generated by performing a quantization process based on determined quantization parameter QP. Then, an entropy encoding process of quantized data d1 of frame f19 is performed. Entropy encoding processes of frames f20, f21, . . . which are a plurality of following frames are also executed in the same manner. The encoding processes of respective frames f19, f20, f21, . . . are executed in parallel.

The video encoding method according to this embodiment makes it possible to determine quantization parameter QP based on quantized data d1 even when, for example, the encoding processes of a plurality of frames have not been finished, by determining quantization parameter QP based on quantized data d1 of at least one frame among quantized data d1 of the plurality of frames. In this way, it is possible to accelerate quantization processes and encoding processes. Furthermore, it is possible to increase accuracy in rate control in encoding processes more significantly by determining quantization parameter QP based on quantized data d1 of the one frame than in the case of determining quantization parameter QP based on, for example, partial data of a frame.

Although the video encoding method has been described above, an encoding processing method which is executed in encoding processing apparatus 2 is described hereinafter.

Figure 7:
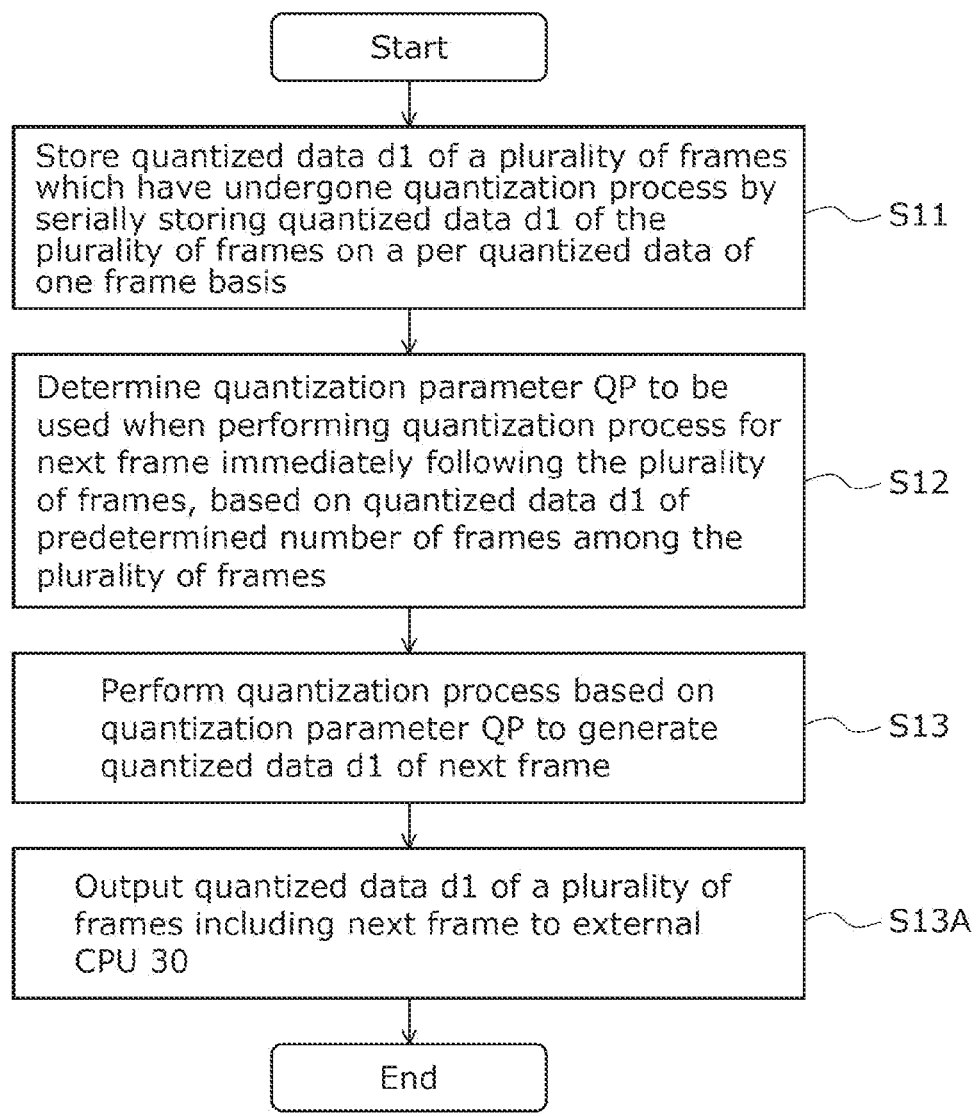
FIG. 7 is a flow chart indicating an encoding processing method according to Embodiment 1.

FIG. 7 is a flow chart indicating a video encoding method according to Embodiment 1. The encoding processing method includes processes in S11, S12, S13, and S13A indicated below.

(S11) Storing storing quantized data d1 of a plurality of frames which have undergone a quantization process by serially storing quantized data d1 of the plurality of frames on a per quantized data d1 of one frame basis (S12) Determining quantization parameter QP to be used when a quantization process of a next frame immediately following the plurality of frames is performed, based on quantized data d1 of a predetermined number of frames among quantized data d1 of the plurality of frames (S13) Performing the quantization process of the next frame based on quantization parameter QP to generate quantized data d1 of the next frame (S13A) Outputting quantized data d1 of a plurality of frames including the next frame to external CPU 30

The encoding processing method is executed by encoding processing apparatus 2, that is, accelerator 20.

[1-3. Effects, etc.]

A video encoding method according to this embodiment includes: storing quantized data d1 of a plurality of frames which have undergone a quantization process by serially storing quantized data d1 of the plurality of frames on a per quantized data d1 of one frame basis; determining quantization parameter QP to be used when a quantization process of a next frame immediately following the plurality of frames is performed, based on quantized data d1 of at least one frame among quantized data d1 of the plurality of frames; performing the quantization process of the next frame based on quantization parameter QP to generate quantized data d1 of the next frame; and executing encoding processes for entropy encoding quantized data d1 of a plurality of frames including the next frame in parallel between the plurality of frames including the next frame.

In this way, it is possible to determine quantization parameter QP based on quantized data d1 even when, for example, the encoding processes of the plurality of frames have not been finished, by determining quantization parameter QP based on quantized data d1 of the at least one frame among quantized data d1 of the plurality of frames. In this way, it is possible to accelerate quantization processes and encoding processes. Furthermore, it is possible to increase accuracy in rate control in encoding processes more significantly by determining quantization parameter QP based on quantized data d1 of the one frame than in the case of determining quantization parameter QP based on, for example, the partial data of the frame.

The encoding processes of the plurality of frames including the next frame may be started individually at different points of time.

In this way, starting the encoding processes individually at different points of time makes it possible to start the encoding processes of the respective frames at good timings in response to the ends of the quantization processes of the respective frames. In this way, it is possible to accelerate the encoding processes.

The video encoding method may further include outputting the processing results obtained through the encoding processes in the same order as the order of starting the encoding processes.

With this, it is possible to correctly re-arrange the processing results of the encoding processes of the plurality of frames executed in parallel.

Furthermore, when the quantization parameter QP is determined, quantization parameter QP may be determined based on the amount of quantized data of the at least one frame.

In this way, it is possible to appropriately determine quantization parameter QP by determining quantization parameter QP based on the amount of quantized data d1. In this way, it is possible to increase accuracy in rate control in encoding processes.

In addition, quantization parameter QP may be determined based on a value obtained by multiplying the amount of data by a predetermined coefficient.

In this way, it is possible to appropriately determine quantization parameter QP by determining quantization parameter QP based on the value obtained by multiplying the amount of data by the predetermined coefficient. In this way, it is possible to increase accuracy in rate control in the encoding processes.

In addition, when quantization parameter QP is determined, quantization parameter QP may be determined based on quantized data d1 of a predetermined number of frames among the plurality of frames.

By doing so, it is possible to determine quantization parameter QP based on quantized data d1 regardless of whether the encoding processes of the plurality of frames have been finished. In this way, it is possible to accelerate the quantization processes.

Alternatively, each of the encoding processes may be executed by CPU 30, and the quantization process may be executed by accelerator 20 connected to CPU 30 via communication interface 50. The video encoding method may further include outputting, to CPU 30 via communication interface 50, one of (i) quantized data d1 of the one frame which has undergone the quantization process by accelerator 20 and (ii) computed data d1 based on quantized data d1.

In this way, quantization processes can be executed by accelerator 20 capable of performing fast quantization processes, and encoding processes can be executed by versatile CPU 30. In this way, it is possible to accelerate the quantization processes and the encoding processes.

The one of the quantized data of the one frame and the computed data may be output from accelerator 20 to CPU 30 when the quantization process of the one frame by accelerator 20 is finished.

In this way, an encoding process can be executed each time a quantization process is finished, thereby accelerating the quantization processes and the encoding processes.

An encoding processing method according to this embodiment includes: storing quantized data d1 of a plurality of frames which have undergone a quantization process by serially storing quantized data d1 of the plurality of frames on a per quantized data d1 of one frame basis; determining quantization parameter QP to be used when performing a quantization process of a next frame immediately following the plurality of frames, based on quantized data d1 of at least one frame among quantized data d1 of the plurality of frames; performing the quantization process of the next frame based on quantization parameter QP to generate quantized data d1 of the next frame; and outputting quantized data d1 of a plurality of frames including the next frame to an external CPU.

In this way, it is possible to determine quantization parameter QP based on quantized data d1 even when, for example, the encoding processes of the plurality of frames have not been finished, by determining quantization parameter QP based on quantized data d1 of the at least one frame among quantized data d1 of the plurality of frames. In this way, it is possible to accelerate the quantization processes. Furthermore, it is possible to increase accuracy in rate control in the encoding processes more significantly by determining quantization parameter QP based on quantized data d1 of the one frame than in the case of determining quantization parameter QP based on, for example, the partial data of the frame.

In addition, when quantization parameter QP is determined, quantization parameter QP may be determined based on quantized data d1 of the predetermined number of frames among the plurality of frames.

By doing so, it is possible to determine quantization parameter QP based on quantized data d1 regardless of whether the encoding processes of the plurality of frames have been finished. In this way, it is possible to accelerate the quantization processes.

Each quantization process may be started by receiving a quantization instruction output from CPU 30.

In this way, the quantization process can be reliably started and thus can be accelerated.

The quantization instruction may be output from CPU 30 after the quantization process of the frame immediately before a current frame to undergo a quantization process is started.

In this way, the quantization process can be started at an appropriate timing and thus can be accelerated.

In addition, when a plurality of threads are executed at the same time in CPU 30 and the encoding processes of the plurality of frames are assigned respectively to the plurality of threads, the quantization instruction may be output from CPU 30 after an encoding process of a first frame among the encoding processes of the plurality of frames is finished in a predetermined thread among the plurality of threads and an encoding process of a second frame different from the first frame among the plurality of frames is started.

In this way, the quantization process can be started at the appropriate timing and accelerated.

Video encoding apparatus 1 according to this embodiment includes: quantized data storage 109 which stores quantized data d1 of a plurality of frames which have undergone a quantization process by serially storing quantized data d1 of the plurality of frames on a per quantized data d1 of one frame basis; rate controller 138 which determines an amount of bit data of a next frame immediately following the plurality of frames, based on quantized data d1 of at least one frame among quantized data d1 of the plurality of frames; parameter determiner 110 which determines quantization parameter QP to be used when a quantization process of the next frame is performed, based on the amount of bit data determined by the rate controller; quantizer 108 which performs the quantization process of the next frame based on quantization parameter QP to generate quantized data d1 of the next frame; and encoder 130 which executes encoding processes for entropy encoding quantized data d1 of a plurality of frames including the next frame in parallel between the plurality of frames including the next frame.

In this way, rate controller 138 determines the amount of bit data using quantized data d1 of the at least one frame among quantized data d1 of the plurality of frames, parameter determiner 110 determines quantization parameter QP based on the determined amount of bit data. This makes it possible to determine quantization parameter QP based on quantized data d1 even when, for example, the encoding processes by encoder 130 have not been finished. In this way, it is possible to accelerate the quantization processes and the encoding processes. Furthermore, it is possible to increase accuracy in rate control in encoding processes more significantly by determining quantization parameter QP based on quantized data d1 of the one frame than in the case of determining quantization parameter QP based on, for example, the partial data of the frame.

Encoding processing apparatus 2 according to this embodiment includes: quantized data storage 109 which stores quantized data d1 of a plurality of frames which have undergone a quantization process by serially storing quantized data d1 of the plurality of frames on a per quantized data d1 of one frame basis; parameter determiner 110 which receives, from outside, an amount of bit data determined using quantized data d1 of at least one frame among quantized data d1 of the plurality of frames, and determines quantization parameter QP to be used when a quantization process of a next frame immediately following the plurality of frames is performed; quantizer 108 which performs the quantization process of the next frame based on quantization parameter QP to generate quantized data d1 of the next frame.

In this way, it is possible to determine quantization parameter QP based on quantized data d1 even when, for example, the encoding processes of the plurality of frames have not been finished, by receiving, from outside, the amount of bit data determined using quantized data d1 of the at least one frame among quantized data d1 of the plurality of frames, and determining quantization parameter QP based on quantized data d1. In this way, it is possible to accelerate the quantization processes. Furthermore, it is possible to increase accuracy in rate control in the encoding processes more significantly by determining quantization parameter QP based on quantized data d1 of the one frame than in the case of determining quantization parameter QP based on, for example, the partial data of the frame.

[1-4. Variation 1 of Embodiment 1]

Next, video encoding apparatus 1A according to Variation 1 of Embodiment 1 is described. Variation 1 describes an example in which rate controller 138 is provided not in CPU 30 but in accelerator 20.

Figure 8:
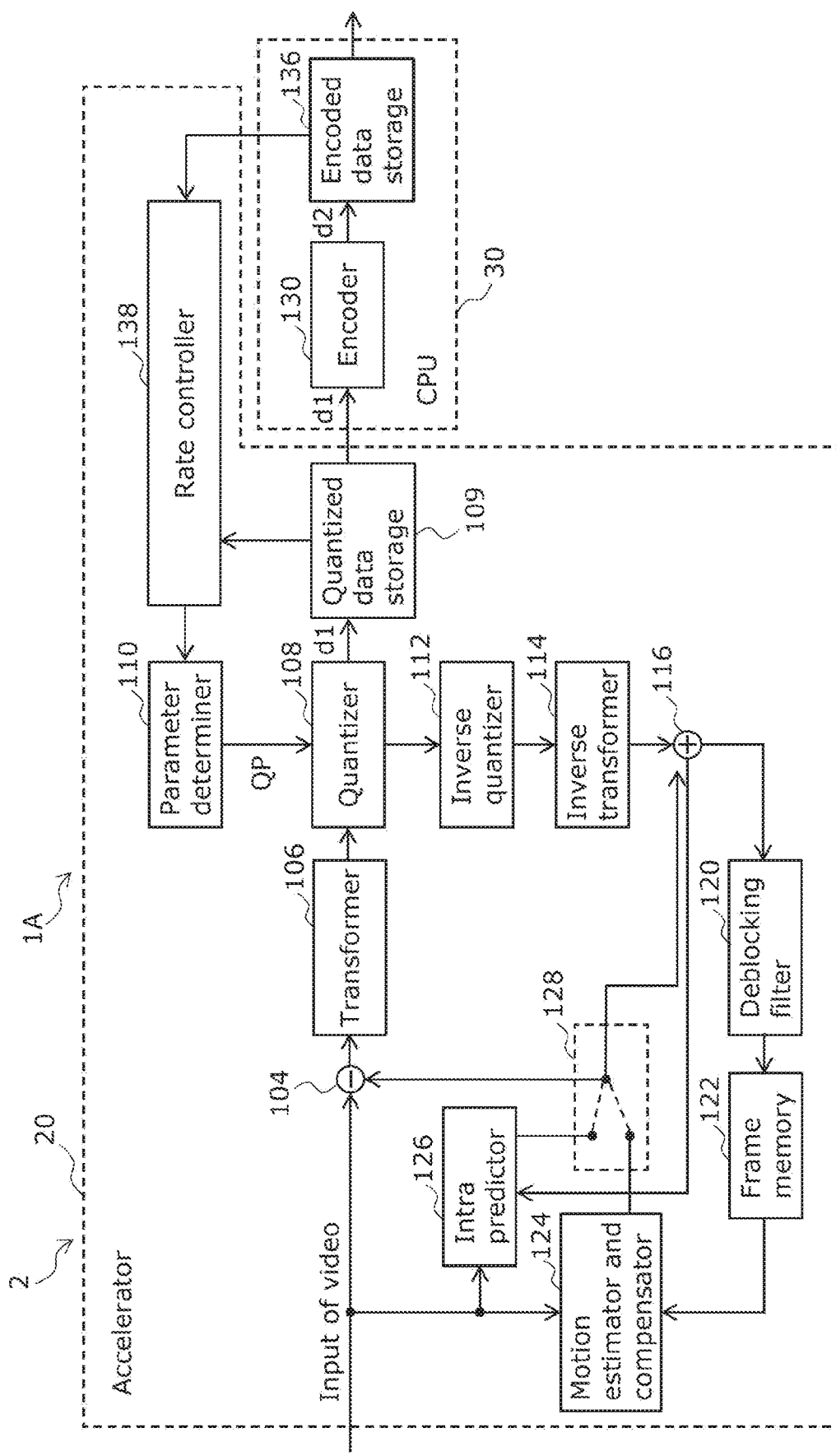
FIG. 8 is a block structural diagram of a video encoding apparatus according to Variation 1 of Embodiment 1.

FIG. 8 is a block structural diagram of video encoding apparatus 1A according to Variation 1 of Embodiment 1.

As illustrated in FIG. 8, video encoding apparatus 1A includes subtractor 104, transformer 106, quantizer 108, quantized data storage 109, parameter determiner 110, encoder 130, encoded data storage 136, and rate controller 138. When a software program stored in memory 40 is executed, each of the functions of encoder 130 and encoded data storage 136 is executed by CPU 30. Furthermore, each of the functions of subtractor 104, transformer 106, quantizer 108, quantized data storage 109, parameter determiner 110, and rate controller 138 is executed by accelerator 20.

Information regarding the amount of encoded data d2 stored in encoded data storage 136 is output to rate controller 138 in accelerator 20 via communication interface 50.

Rate controller 138 determines a target amount of bit data of a frame next to a plurality of past frames, based on an amount of bit data of the plurality of past frames. Rate controller 138 obtains information about the amount of encoded data d2 output from encoded data storage 136, receives quantized data d1 output from quantized data storage 109, and obtains information about the amount of past quantized data d1. Rate controller 138 determines the amount of bit data when an encoding process of the next frame is performed based on the obtained information about the amounts of data.

Video encoding apparatus 1A according to Variation 1 is also capable of accelerating quantization processes and encoding processes by determining quantization parameter QP based on quantized data d1 of at least one frame among quantized data d1 of a plurality of frames. Furthermore, video encoding apparatus 1A is capable of increasing accuracy in rate control more significantly by determining quantization parameter QP based on quantized data d1 of one frame than in the case of determining quantization parameter QP based on, for example, partial data of a frame.

[1-5. Variation 2 of Embodiment 1]

Next, video encoding apparatus 1B according to Variation 2 of Embodiment 1 is described. Variation 2 describes an example in which a rate controller is configured with first rate controller 138a and second rate controller 138b; and first rate controller 138a is provided in CPU 30 and second rate controller 138b is provided in accelerator 20.

Figure 9:
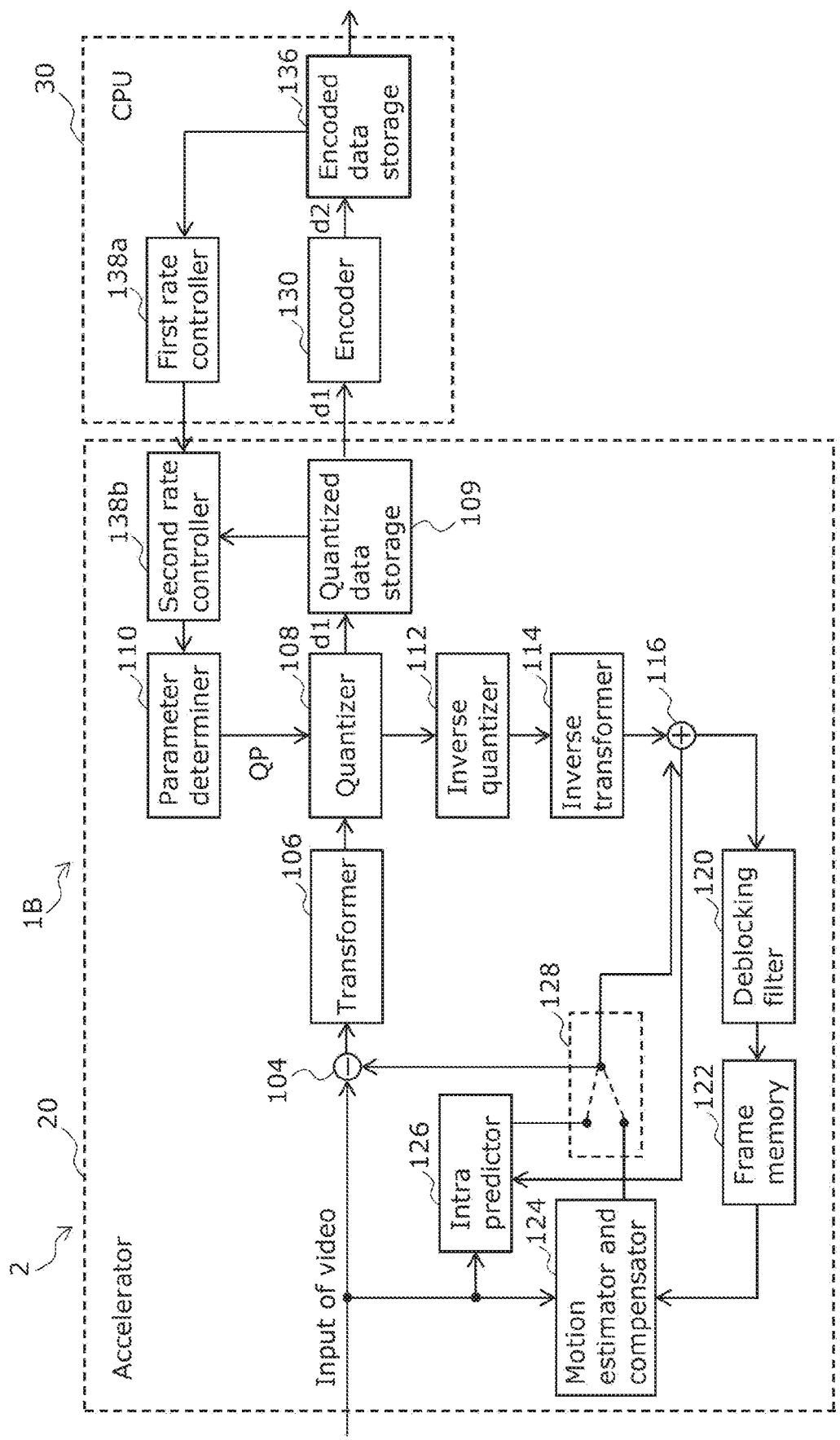
FIG. 9 is a block structural diagram of a video encoding apparatus according to Variation 2 of Embodiment 1.

FIG. 9 is a block structural diagram of video encoding apparatus 1B according to Variation 2.

As illustrated in FIG. 9, video encoding apparatus 1B includes subtractor 104, transformer 106, quantizer 108, quantized data storage 109, first rate controller 138a, second rate controller 138b, parameter determiner 110, encoder 130, encoded data storage 136, and rate controller 138. When a software program stored in memory 40 is executed, each of the functions of encoder 130, encoded data storage 136, and first rate controller 138a illustrated in FIG. 9 is executed by CPU 30. Furthermore, each of the functions of subtractor 104, transformer 106, quantizer 108, quantized data storage 109, parameter determiner 110, and second rate controller 138b is executed by accelerator 20.

Information about the amount of encoded data d2 stored in encoded data storage 136 is output to first rate controller 138a. First rate controller 138a obtains information about the amount of encoded data d2 output from encoded data storage 136, and outputs the obtained information to second rate controller 138b via communication interface 50. Second rate controller 138b receives quantized data d1 output from quantized data storage 109, and obtains information about the amount of past quantized data d1. Rate controller 138b determines the amount of bit data when an encoding process of the next frame is performed based on the obtained information about the amounts of data.

Video encoding apparatus 1B according to Variation 2 is also capable of accelerating quantization processes and encoding processes by determining quantization parameter QP based on quantized data d1 of at least one frame among quantized data d1 of a plurality of frames. Furthermore, video encoding apparatus 1B is capable of increasing accuracy in rate control more significantly by determining quantization parameter QP based on quantized data d1 of one frame than in the case of determining quantization parameter QP based on, for example, partial data of a frame.

Embodiment 2

A video encoding method according to Embodiment 2 is described with reference to FIG. 10. The video encoding method according to Embodiment 2 describes an example in which both quantized data d1 and encoded data d2 are used when quantization parameter QP is determined. It is to be noted that video encoding apparatus 1 which executes the video encoding method according to Embodiment 2 is the same as in Embodiment 1, and thus overlapping descriptions are not repeated.

Figure 10:
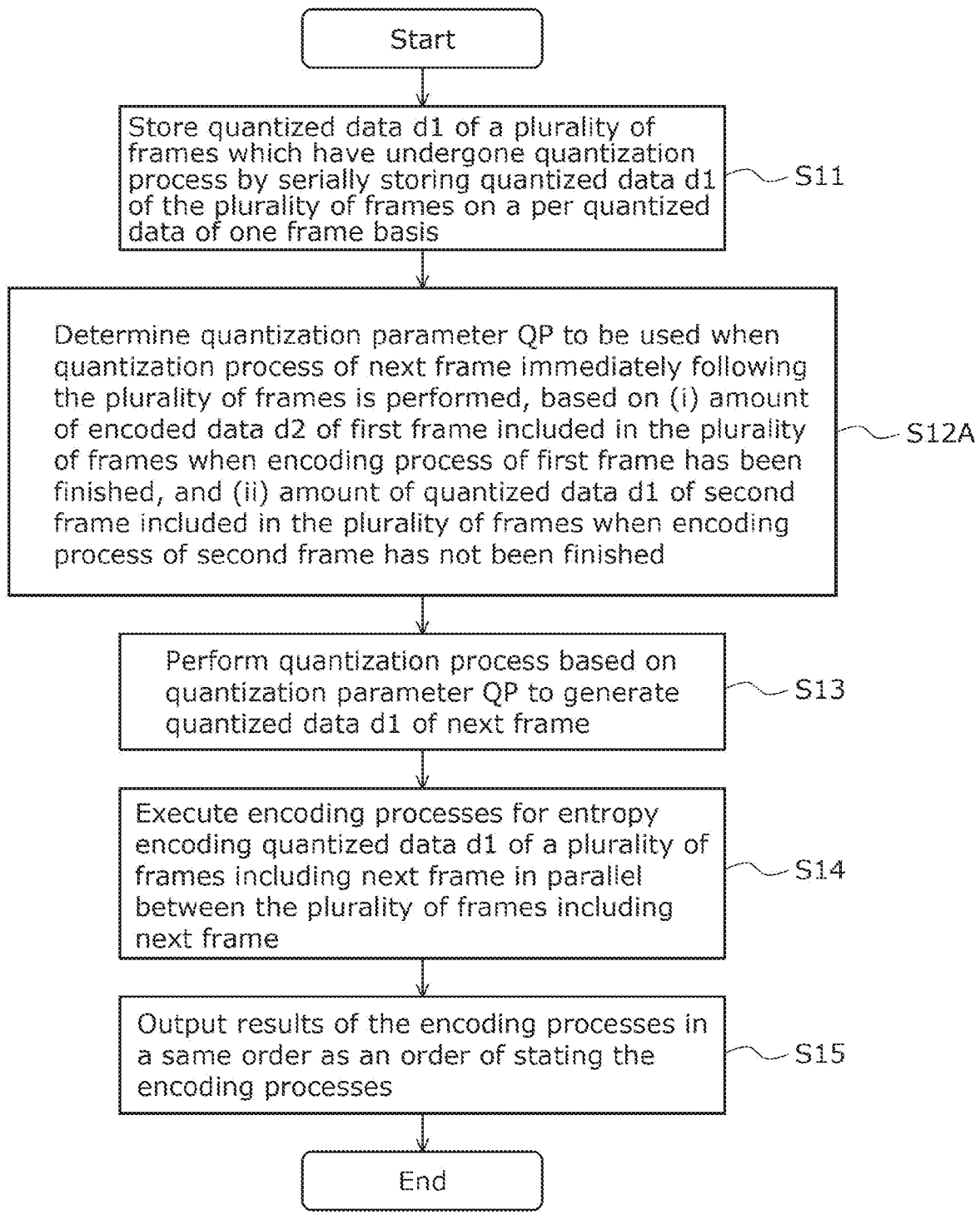
FIG. 10 is a flow chart indicating a video encoding method according to Embodiment 2.

FIG. 10 is a flow chart indicating the video encoding method according to Embodiment 2. The video encoding method includes processes in S11, S12A, S13, S14, and S15 indicated below.

(S11) Storing quantized data d1 of a plurality of frames which have undergone a quantization process by serially storing quantized data d1 of the plurality of frames on a per quantized data d1 of one frame basis (S12A) Determining quantization parameter QP to be used when a quantization process of a next frame immediately following the plurality of frames, based on (i) an amount of encoded data d2 of a first frame included in the plurality of frames when an encoding process of the first frame has been finished, and (ii) an amount of quantized data d1 of a second frame included in the plurality of frames when an encoding process of the second frame has not been finished (S13) Performing the quantization process of the next frame based on quantization parameter QP to generate quantized data d1 of the next frame (S14) Executing encoding processes for entropy encoding quantized data d1 of a plurality of frames including the next frame in parallel between the plurality of frames including the next frame (S15) Outputting results of the encoding processes in a same order as an order of stating the encoding processes The video encoding method is executed by video encoding apparatus 1. Although the processes in S11 to S14 are described in time series focusing on a particular frame, in the video encoding method, quantization processes and encoding processes are actually performed by accelerator 20 and CPU 30 at the same time.

In the video encoding method according to Embodiment 2, quantization parameter QP is determined based on (i) an amount of encoded data d2 of a first frame when an encoding process of the first frame has been finished, and (ii) an amount of quantized data d1 of a second frame when an encoding process of the second frame has not been finished. The first frame and the second frame are included in the plurality of frames. In this way, it is possible to further increase accuracy in rate control compared with Embodiment 1.

Other Embodiments

Although the video encoding apparatus, etc., according to the aspects of the present disclosure have been described based on the embodiments, etc., the present disclosure is not limited to the embodiments, etc. For example, the present disclosure may cover and encompass other embodiments which can be implemented by combining any of the elements described in the Specification or by excluding some of the elements. Furthermore, the present disclosure covers and encompasses variations obtainable by adding, to any of the above-described embodiments, various kinds of modification that any person skilled in the art would arrive at within the scope of the present disclosure, in other words, without deviating from the scope of the claims which is indicated by the claim language.

Although parameter determiner 110 is provided in accelerator 20 in video encoding apparatus 1 according to Embodiment 1, this is a non-limiting example. It is to be noted that parameter determiner 110 may be provided in CPU 30. In such a case, quantized parameter QP determined in parameter determiner 110 in CPU 30 is output to quantizer 108 in accelerator 20 via communication interface 50.

Although the encoding processes by video encoding apparatus 1 include binarization processes and stream generation processes, but this is a non-limiting example. For example, an encoding process may include at least one of a binarization process, an arithmetic encoding process, or a stream generation process. In addition, encoding processes, each of which includes the at least one process or combination, of a plurality of frames may be executed in parallel.

When a software program is executed in video encoding apparatus 1, each of the functions of encoder 130, encoded data storage 136, and rate controller 138 illustrated in FIG. 1 is executed by CPU 30, and each of the functions of subtractor 104, transformer 106, quantizer 108, quantized data storage 109, parameter determiner 110, etc., is executed by accelerator 20. However, this is a non-limiting example.

Figure 11:
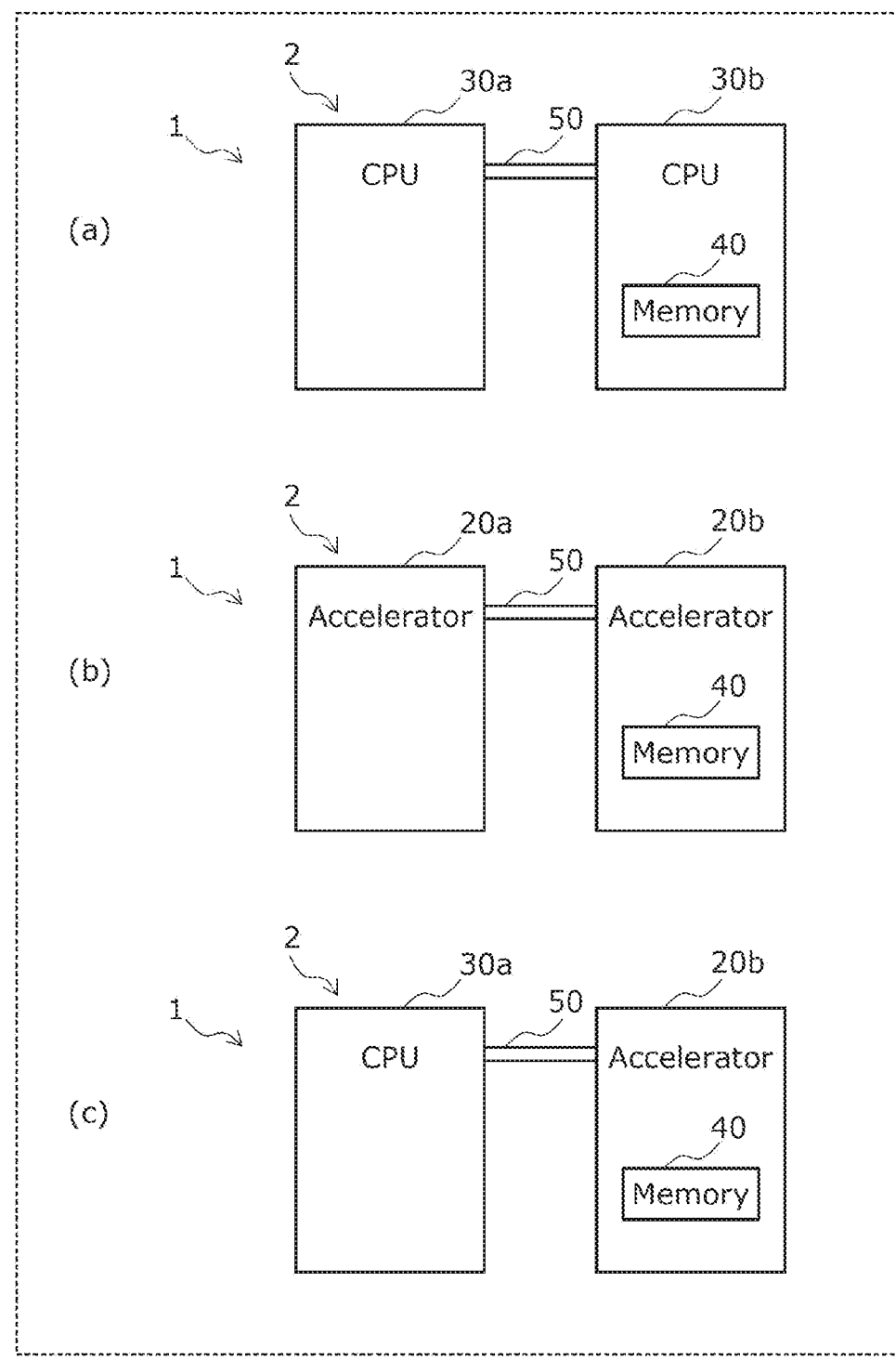
FIG. 11 is a diagram of exemplary structures of a CPU and an accelerator in the video encoding apparatus.

For example, a video encoding apparatus may be configured with a CPU and an accelerator illustrated in any of (a) to (c) in FIG. 11.

In (a) in FIG. 11, video encoding apparatus 1 includes CPU 30a and CPU 30b. Each of the functions of encoder 130, encoded data storage 136, and rate controller 138 is executed by CPU 30b, and each of the functions of subtractor 104, transformer 106, quantizer 108, quantized data storage 109, parameter determiner 110, etc., is executed by CPU 30a different from CPU 30b. In this case, CPU 30a corresponds to an encoding processing apparatus. CPU 30a and CPU 30b may be configured with one CPU.

In (b) in FIG. 11, video encoding apparatus 1 includes accelerator 20a and accelerator 20b. Each of the functions of encoder 130, encoded data storage 136, and rate controller 138 is executed by accelerator 20b, and each of the functions of subtractor 104, transformer 106, quantizer 108, quantized data storage 109, parameter determiner 110, etc., is executed by accelerator 20a different from accelerator 20b. In this case, accelerator 20a corresponds to an encoding processing apparatus. Accelerator 20a and accelerator 20b may be configured with one accelerator.

In (c) in FIG. 11, video encoding apparatus 1 includes CPU 30a and accelerator 20b. Each of the functions of encoder 130, encoded data storage 136, and rate controller 138 is executed by accelerator 20b, and each of the functions of subtractor 104, transformer 106, quantizer 108, quantized data storage 109, parameter determiner 110, etc., is executed by CPU 30a. In this case, CPU 30a corresponds to an encoding processing apparatus.

In addition, embodiments indicated below may be covered and encompassed within the scope of the one or more aspects of the present disclosure.

(1) Some of the constituent elements of the video encoding apparatus may be a computer system configured with a microprocessor, a ROM, a RAM, etc. The RAM stores a computer program. The computer system achieves its functions through the microprocessor's operations according to the computer program. Here, the computer program is configured by combining a plurality of instruction codes each indicating a command to the computer, in order to achieve predetermined functions.

(2) Some of the constituent elements of the video encoding apparatus may be configured with a single system large scale integration (LSI). The system LSI is a super-multi-function LSI manufactured by integrating constituent units on a single chip. Specifically, the system LSI is a computer system configured to include a microprocessor, a ROM, a RAM, and so on. The RAM stores a computer program. The system LSI achieves its functions through the microprocessor's operations according to the computer program.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to video encoding apparatuses for encoding videos and encoding processing apparatuses.

The invention claimed is:

1. A video encoding method comprising:
storing quantized data of a plurality of frames which have undergone a quantization process by serially storing the quantized data of the plurality of frames on a per quantized data of one frame basis;
determining a quantization parameter to be used when a quantization process of a next frame immediately following the plurality of frames is performed, based on quantized data of at least one frame among the quantized data of the plurality of frames;
performing the quantization process of the next frame based on the quantization parameter to generate quantized data of the next frame; and
executing encoding processes for entropy encoding quantized data of a plurality of frames including the next frame in parallel between the plurality of frames including the next frame,
wherein, in the determining the quantization parameter, the quantization parameter is determined based on (i) an amount of encoded data of a first frame when an encoding process for entropy encoding quantized data of the first frame has been finished, and (ii) an amount of quantized data of a second frame when an encoding process for entropy encoding quantized data of the second frame has not been finished, the first frame and the second frame being included in the plurality of frames.

2. The video encoding method according to claim 1, wherein the encoding processes of the plurality of frames including the next frame are started at different points of time.

3. The video encoding method according to claim 1, further comprising:
outputting results of the encoding processes in a same order as an order of stating the encoding processes.

4. The video encoding method according to claim 1, wherein, in the determining the quantization parameter, the quantization parameter is determined based on quantized data of a predetermined number of frames among the quantized data of the plurality of frames which have not yet finished encoding processes for entropy encoding.

5. The video encoding method according to claim 1, wherein each of the encoding processes is executed by a central processing unit (CPU), and
the quantization process is executed by an accelerator connected to the CPU via a communication interface,
the video encoding method further comprises:
outputting, to the CPU via the communication interface, one of (i) the quantized data of the one frame which has undergone the quantization process by the accelerator and (ii) computed data based on the quantized data.

6. The video encoding method according to claim 5, wherein the one of the quantized data and the computed data of the one frame is output from the accelerator to the CPU when the quantization process of the one frame by the accelerator is finished.

7. An encoding processing method comprising:
storing quantized data of a plurality of frames which have undergone a quantization process by serially storing the quantized data of the plurality of frames on a per quantized data of one frame basis;
determining a quantization parameter to be used when performing a quantization process of a next frame immediately following the plurality of frames, based on quantized data of at least one frame among the quantized data of the plurality of frames;

performing the quantization process of the next frame based on the quantization parameter to generate quantized data of the next frame; and outputting quantized data of a plurality of frames including the next frame to an external central processing unit (CPU), wherein, in the determining the quantization parameter, the quantization parameter is determined based on (i) an amount of encoded data of a first frame when an encoding process for entropy encoding quantized data of the first frame has been finished, and (ii) an amount of quantized data of a second frame when an encoding process for entropy encoding quantized data of the second frame has not been finished, the first frame and the second frame being included in the plurality of frames.

8. The encoding processing method according to claim 7, wherein, in the determining the quantization parameter, the quantization parameter is determined based on quantized data of a predetermined number of frames among the plurality of frames which have not yet finished encoding processes for entropy encoding.

9. The encoding processing method according to claim 7, wherein the quantization process is started in response to a quantization instruction which is output from the CPU.

10. The encoding processing method according to claim 9, wherein the quantization instruction is output from the CPU after a quantization process of a frame which is immediately before a current frame to undergo a quantization process is started.

11. The encoding processing method according to claim 9, wherein when a plurality of threads are executed at a same time in the CPU and the encoding processes of the plurality of frames are assigned respectively to the plurality of threads, the quantization instruction is output from the CPU after an encoding process of a first frame among the encoding processes of the plurality of frames is finished in a predetermined thread among the plurality of threads and an encoding process of a second frame different from the first frame among the plurality of frames is started.

12. A video encoding apparatus comprising:

a quantized data storage which stores quantized data of a plurality of frames which have undergone a quantization process by serially storing the quantized data of the plurality of frames on a per quantized data of one frame basis;

a rate controller which determines an amount of bit data of a next frame immediately following the plurality of frames, based on quantized data of at least one frame among the quantized data of the plurality of frames;

a parameter determiner which determines a quantization parameter to be used when a quantization process of the next frame is performed, based on the amount of bit data determined by the rate controller;

a quantizer which performs the quantization process of the next frame based on the quantization parameter to generate quantized data of the next frame; and an encoder which executes encoding processes for entropy encoding quantized data of a plurality of frames including the next frame in parallel between the plurality of frames including the next frame, wherein, the parameter determiner determines the quantization parameter based on (i) an amount of encoded data of a first frame when an encoding process for entropy encoding quantized data of the first frame has been finished, and (ii) an amount of quantized data of a second frame when an encoding process for entropy encoding quantized data of the second frame has not been finished, the first frame and the second frame being included in the plurality of frames.

* * * * *